United States Patent [19]

Norback

[11] E Re. 30,575

[45] Reissued Apr. 14, 1981

[54] METHOD OF MANUFACTURING A CONTACT BODY

[75] Inventor: Per Norback, Lidingo, Sweden

[73] Assignee: A B Munters, Sollentuna, Sweden

[21] Appl. No.: 33,237

[22] Filed: Apr. 25, 1979

Related U.S. Patent Documents

Reissue of:

[64] Patent No.: 4,021,282
Issued: May 3, 1977
Appl. No.: 564,117
Filed: Apr. 1, 1975

[30] Foreign Application Priority Data

Apr. 9, 1974 [SE] Sweden ..... 7404816

[51] Int. Cl.[3] ..... B05D 1/18; B05D 1/38; B05D 3/02; B05D 3/04

[52] U.S. Cl. ..... 156/210; 427/243; 427/344; 427/372.2; 427/379; 427/397.8

[58] Field of Search ..... 156/210; 427/243, 344, 427/372 B, 372 R, 379, 372.2, 397.8

[56] References Cited

U.S. PATENT DOCUMENTS

| | | | |
|---|---|---|---|
| 1,972,500 | 9/1934 | Toohey et al. | 428/186 X |
| 2,354,350 | 7/1944 | Schvetz | 428/443 |
| 2,354,351 | 7/1944 | Schvetz | 427/403 X |
| 2,434,466 | 1/1948 | Marc | 428/443 |
| 3,499,812 | 3/1970 | Glav | 428/443 X |

FOREIGN PATENT DOCUMENTS

| | | | |
|---|---|---|---|
| 998132 | 7/1965 | United Kingdom | 428/186 |
| 1040061 | 8/1966 | United Kingdom | 428/186 |
| 1140042 | 1/1969 | United Kingdom | 428/186 |

*Primary Examiner*—James R. Hoffman
*Attorney, Agent, or Firm*—Curtis, Morris, Safford

[57] ABSTRACT

A method of manufacturing a contact body for at least one flowing medium is disclosed wherein layers of asbestos fibers are formed and arranged so that the layers bear against one another at mutually spaced positions to provide channels in the body extending from one end thereof to the other to allow the flowing medium to pass therethrough. The layers of the contact body are first treated by supplying to the layers at least one inorganic substance which produces a [hydrated] precipitate on the asbestos fibers of the layers. Thereafter the layers are heated to a temperature which is at least within a temperature range at which the [hydrated precipitate releases its] *asbestos fibers release their* water of crystallization, but which temperature is below the sintering temperature for the substances remaining in the body. As a further step, at least one further substance is supplied to the contact body layers which restores the mechanical strength of the body lost by the transformation of the asbestos fibers during the heating step.

10 Claims, No Drawings

METHOD OF MANUFACTURING A CONTACT BODY

Matter enclosed in heavy brackets [ ] appears in the original patent but forms no part of this reissue specification; matter printed in italics indicates the additions made by reissue.

The present invention relates to a method of manufacturing a contact body for at least one flowing medium, preferably for use as an exchanger body for heat and/or moisture. The contact body is made up of layers of asbestos fibres so arranged that the layers bear against one another at mutually spaced positions so as to form channels extending from end to end of the body. The spacing of the layers of the contact body may be effected in any suitable manner for example alternate layers may be wholly or partially corrugated or formed with longitudinal protruberances which bear against interposed even layers.

A suitable field of application of the invention is the transfer of heat and/or moisture between two air currents for example in the ventilation of rooms or spaces of fresh air or in the drying of air.

A contact body built up of asbestos layers or thin sheets has in itself insufficient mechanical strength, and, it is known to impregnate the layers with inorganic substances adapted together to produce a water-insoluble coating or precipitate on the layers which improve the mechanical strength or wet strength of the contact body. Examples of such known methods are to be found in the British Patent Specifications Nos. 998,132 and 1,040,061. As impregnating substances, there may be mentioned e.g. water-glass solution and calcium chloride which together form a scarcely soluble precipitate of calcium and silicon compounds on the layers or the fibres. The precipitate may even be constituted by silica, the layers being impregnated with water-glass solution and an acid which together form a gel, which on increase of the temperature is transferred into a water-insoluble deposit of silica. In these known processes, the contact body is heated after, or during, the production of the solid precipitate in order on one hand to remove organic constituents present in the asbestos layers and on the other hand to increase the mechanical strength of the deposit and therewith the strength of the layers. In these processes, the temperature to which the contact body has been heated has not been so much as to reach the transformation or so-called crystallization point for the asbestos fibres in order to avoid losing their fibrous character and therewith their inherent mechanical strength by releasing the water of crystallisation. When heated over the transformation point, the asbestos fibres are transformed into an almost powdery consistency, which cannot contribute in imparting the required stability and strength to the contact body. Furthermore, it is known (British Patent Specification No. 1,140,042) to provide a contact body blank made of asbestos fibres according to the above method with a coating of one or several substances which on heating to a temperature exceeding the point o crystallization or the point of dehydration for the asbestos fibres sinter together and form a skeleton which substitutes the asbestos fibres and imparts to the body the required mechanical strength. Thus, the layers forming the body becomes some kind of ceramic product. The deposit can be obtained by impregnating the layers with aluminum chloride and water-glass in aqueous solution, and by heating a phase containing aluminium and silica so that easy sintering together is obtained. The temperature must be high, such as about 1000° C. or more, and the final temperature must be kept within narrow limits in order to avoid the layers losing their shape and collapsing. It is difficult to maintain a homogeneous temperature in a furnace. Furthermore, the precipitate often will have irregular composition in various parts of the body, and as a consequence require different final temperatures in order to sinter to the skeletons aimed at.

According to the present invention a method of manufacturing a contact body for at least one flowing medium comprises the steps of forming layers of asbestos fibres arranged so that the layers bear against one another at mutually spaced positions to provide channels in the body extending from end to end for the media, effecting a first treatment on the layers by supplying to the layers at least one inorganic substance which produces a [hydrated] precipitate on the asbestos fibres of the layers, heating the layers so treated to a temperature which is at least within a temperature range at which [the hydrated precipitate releases its] water of crystallization *is released* but which is below the sintering temperature for the substances remaining in the body and, effecting a second treatment by supplying at least one further substance which restores the mechanical strength of the body lost by the transformation of the asbestos fibres during the heating step.

A suitable embodiment of the invention is that every alternate layer is corrugated and every second one even, the layers bearing against one another along the ridges of the corrugations so that the contact body is filled with mutually parallel channels extending from end to end. The contact body may have the form of a rotor which is rotatable between two different passages through each of which a separate air current flows, such as used air escaping from a room and fresh air entering the room for example.

By the invention it is now proposed that the contact body, after the layers have been coated with the scarcely soluble precipitate, is heated to a temperature within or over that temperature range within which the water of crystallization is released, but below the sintering temperature for the substances remaining in the body. The body is then treated with substances, preferably inorganic substances, which this time restore the mechanical strength of the body lost by the transformation of the asbestos fibres. By the repeated treatment, such as the deposition of inorganic substances scarcely soluble in water onto the layers, the temperature can be kept within the limits which distinguish the known processes described above, viz. within the range between about 650° C. and the temperature value at which the substance sinters or fuses. This value is lower than 1000° C., such as 800°-900° C. After the first coating with the insoluble reaction product and subsequent heating the cohesion between the components of the coating and the asbestos residue is broken to such a degree that the strength of the body is impaired by the elimination of the asbestos fibre structure, but it is still sufficient to be capable of enduring the second impregnation step. This step now brings about a fastening or cementing together of the individual components of the first coating and the asbestos residue so that the layers obtain very good strength or hardness. This strength is better than that obtained by the first known method described above where the moderate heating leaves the asbestos fibre structure unchanged. At the same time, one is not dependent on the exact final temperature in the heating as is required in the second method described above, but can operate within a relatively wide temperature range which simplifies the manufacture.

In a particularly suitable embodiment of the invention there is initially formed a web composed of two layers or strips of asbestos paper of which one is folded or corrugated with mutually parallel folds and the other is plane. The two layers are glued together at their places of contact at the corrugation ridges e.g. by means of water-glass and then formed into a cylindrical rotor by spirally winding the web to the desired diameter of the rotor. Alternatively blocks of such layers may first be formed which are then cut into sectors or segments by sawing so as to form the desired shape of the rotor e.g. cylindrical. The height of the corrugations or folds which determine the spacing between the plane layers, is preferably less than 3 mms, such as 1.5 mm. The asbestos paper may have a thickness of one tenth or several tenths of one millimeter. In the rotor the channels extend axially between the even flat-sides thereof. Contact bodies of this type are described e.g. in the patent specifications mentioned above.

The rotor built up in this way is immersed thereafter in a solution of sodium or potassium water-glass: the solution having a density of between about 1.25 and 1.30. After the impregnation with this solution, the excess is blown out, whereafter the remaining solution is dehydrated in a known manner by means of a substance, preferably ethyl alcohol, which has high affinity to water whereby the solution is concentrated to a kind of gel. Following this step the rotor is immersed into a concentrated aqueous solution of a salt of calcium, magnesium, zinc or ammonium, or ammonia, or an acid or a mixture thereof.

The substances used in the two immersions are of such a kind that a precipitate or coating scarcely soluble in water is formed on the fibre layers. The same effect can be obtained by passing a gas through the rotor, e.g. carbon dioxide which reacts with the water-glass solution. The precipitate consists of metal-silicon compounds or silica. When using a salt solution as the second component, the solution is kept at an overtemperature, suitably above 90° C.

The rotor is rinsed so that water-soluble components formed in the precipitation are removed, whereafter it is dried. The rotor is then heated in a furnace to a temperature exceeding 650° C. which transforms the asbestos fibres into a powder like state, but the temperature is not raised so high that sintering together of the constituents takes place. The rotor still has the correct shape, but the layers have only just sufficient mechanical strength to support the rotor on being subjected to the subsequent treatment. Thus the rigidity which has been lost is due to the fact that the fibre structure disappears as soon as the dehydration temperature has been exceeded.

The rotor is now subjected to a second impregnation with solutions of two components which together form a precipitate or coating scarcely soluble in water on the layers. This second treatment can be carried out in substantially the same manner as described above, the components being other ones or, preferably, the same as in the first treatment. This time there is effected, after the immersion with the second component, a rinsing out of only soluble reaction products and a drying for removal of the water. The rotor now has a very high strength, and the coating or precipitate also brings about a coherent frame or skeleton between the individual layers. It is of particular importance that a structure manufactured in the manner described above can be imparted a substantial porosity, so that the body can be impregnated with substance important for the function the contact body is to perform, such as an adsorption agent, for example a salt such as lithium chloride or a suspension of a finely powdered solid adsorption agent.

Due to its porosity the body may also be a suitable carrier for catalyst material, in which case it comes in contact with a gaseous medium only.

Instead of as described above the second treatment step can be brought about with a solution of organic matter, such as melamine or phenol. Substances of this kind are especially important when the requirements for the insolubility in water of the impregnating agent are high.

What is claimed is:

[1. A method of manufacturing a contact body for at least one flowing medium comprising the steps of forming layers of asbestos fibers arranged so that the layers bear against one another at mutually spaced positions to provide channels in the body extending from end to end for the media; treating said layers to produce a hydrated substantially non-water-soluble precipitate on the asbestos fibers of the layers, heating the layers so treated to a temperature which is at least within a temperature range at which the hydrated precipitate releases its water of crystallization but which is below the sintering temperature of the body and, thereafter repeating said treating step thereby to restore the mechanical strength of the body lost by transformation of the asbestos fibers during the heating step.]

2. A method according to claim [1] *11* wherein the heating step comprises heating the body to over 650° C.

3. A method according to claim [1] *11* wherein the final temperature in the heating step is lower than 1000° C.

4. A method according to claim [1] *11* wherein the final temperature in the heating step is lower than 900° C.

5. A method according to claim [1] *11* wherein said treating steps are substantially the same.

6. A method according to claim 5 wherein said treating steps include the use of substances soluble in water.

7. A method of manufacturing a contact body for at least one flowing medium comprising the steps of forming layers of asbestos fibers arranged so that the layers bear against one another at mutually spaced positions to provide channels in the body extending form end to end for the media, immersing the body in water glass solution selected from the group consisting of sodium or potassium water glass solutions having a density of between about 1.25 and 1.30; dehydrating the body after said immersing step to form a gel coating on said layers with the water-glass solution therein; thereafter treating said body to form a substantially non-water soluble precipitate on the layers of the body, and thence heating said body to a temperature which is above 650° C. but less than the sintering temperature of the body; and thereafter repeating said steps of immersing, dehydrating, and treating the body.

8. A method as defined in claim 7 wherein said treating step comprises the step of immersing said body in a concentrated aqueous solution selected from the group consisting of solutions of ammonia or a salt of calcium, magnesium, zinc or ammonium, or a mixture thereof.

9. The method as defined in claim 8 wherein said heating step comprises the step of heating the body to between 650° C. and 1000° C.

10. A method as defined in claim 7 wherein said treating step comprises passing $CO_2$ gas through said body.

*11. A method of manufacturing a contact body for at least one flowing medium comprising the steps of forming layers of asbestos fibers arranged so that the layers bear against one another at mutually spaced positions to provide channels in the body extending from end to end for the media; treating said layers to produce a substantially non-water-soluble precipitate on the asbestos fibers of the layers, heating the layers so treated to a temperature which is at least within a temperature range at which water of crystallization is released but which is below the sintering temperature of the body and, thereafter repeating said treating step thereby to restore the mechanical strength of the body lost by transformation of the asbestos fibers during the heating step.*

* * * * *